(12) United States Patent
Boersma

(10) Patent No.: US 6,213,544 B1
(45) Date of Patent: *Apr. 10, 2001

(54) OPEN ROOF CONSTRUCTION FOR A VEHICLE

(75) Inventor: Egbert Boersma, Helmond (NL)

(73) Assignee: Inalfa Industries B.V. (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/145,596

(22) Filed: Sep. 2, 1998

(30) Foreign Application Priority Data

Sep. 10, 1997 (NL) ..................................... 1006986

(51) Int. Cl.[7] ..................................... B60J 7/057
(52) U.S. Cl. ......................................... 296/223; 74/89.17
(58) Field of Search ........................ 296/223; 74/89.17, 74/502.4, 502.6; 49/362

(56) References Cited

U.S. PATENT DOCUMENTS 4,919,005 * 4/1990 Schleicher ........................ 296/223 X
5,746,090 * 5/1998 Boss et al. ........................ 74/502.6 X
5,749,621 * 5/1998 Smith ............................... 296/223 X

FOREIGN PATENT DOCUMENTS

1134564 * 8/1962 (DE) ..................................... 74/89.17
2135803 * 8/1977 (DE) ..................................... 296/223

* cited by examiner

*Primary Examiner*—Dennis H. Pedder
(74) *Attorney, Agent, or Firm*—Westman, Champlin & Kelly, P.A.

(57) ABSTRACT

An open roof construction for a vehicle having a roof opening in its fixed roof comprises a closing device for selectively closing or at least partially opening the roof opening. A driving element for the closing device comprises an outgoing driving wheel. At least one pull-push cable for providing the connection between the driving element and the closing device is guided in a cable guide and over the circumference of the driving wheel for adjustment of the cable by means of the driving element. The cable guide is provided with adaptation elements for adapting the course of the cable guide to the diameter of the driving wheel.

6 Claims, 4 Drawing Sheets

OPEN ROOF CONSTRUCTION FOR A VEHICLE

BACKGROUND OF THE INVENTION

1. Field of the Invention

The present invention relates to an open roof construction for a vehicle having a roof opening in its fixed roof, which open roof construction comprises closing means for selectively closing or at least partially opening said roof opening, a driving element for said closing means, which comprises an outgoing driving wheel, at least one pull-push cable for providing connection between said driving element and said closing means, which cable is guided in a cable guide over the circumference of said driving wheel for adjustment of the cable by means of said driving element.

2. Description of the Related Art

An open roof construction of this kind is known in the art. For example, (see DE 1206740) a casted front beam of a frame of an open roof construction is provided with fixed cable guides, which define the position of the cable along the circumference of the driving wheel. It discloses a part which fits around the cable at the position of the driving wheel. This part is used for preventing wear of the front beam material and for preventing radial movement of the cable.

If it is desired to use a different version of an open roof construction, it then may be desired to obtain a different driving characteristic, for example a slower drive of the closing means with a higher torque. This only can be obtained by using a different driving wheel if the same motor is used. In that case, it is also necessary to exchange the front beam in its entirety for a front beam comprising a different course for the cable, so as to fit the different driving wheel. The exchange of a complete frame part increases the costs.

SUMMARY OF THE INVENTION

The object of the present invention is to provide an electric open roof construction, wherein the above problem is eliminated in a simple manner.

In order to accomplish that objective, the open roof construction according to the invention is characterized in that said cable guide is provided with adaptation means for adapting the course of the cable guide to the diameter of the driving wheel.

Said adaptation means ensure that the frame portion in question can be maintained when a different driving wheel is used, whereby the adaptation means provide the required adaptation. Said adaptation means may consist of adaptable elements in the cable guide, and it is also possible to use insert pieces for adapting the course of the cable guide.

It is preferred to use an embodiment wherein the adaptation means are provided with an exchangeable adaptation element to be placed adjacent to the driving wheel on the one hand and contiguously to the stationary cable guide on the other hand.

In this manner, a part of the cable guide adjacent to the driving wheel can be exchanged, as it were, and only this part needs to be replaced when a different driving wheel is to be used. The adaptation element may be made of a plastic or of a metal, and it can be placed into a standard cavity in the frame portion in question, whereby the external dimensions of the various adaptation elements are identical, whereas the internal dimensions are different.

The invention also relates to a method for adapting the driving characteristic of a driving element for movable closing means of an open roof construction for a vehicle, which driving element is fitted with an outgoing driving wheel, where a pull-push cable provides the connection between the driving wheel and the closing means, which cable is guided over the circumference of the driving wheel for adjustment of the cable by means of the driving wheel.

According to the invention, said method is characterized in that the adjustment is carried out by selecting a driving wheel having a desired diameter from a set of several driving wheels having varying diameters, and using adaptation means for locally adapting the course of the cable to the diameter of the driving wheel.

It is possible to use in the method of the invention adaptation means which consist of adaptable elements, and it is also possible to use insert pieces for adapting the course of the cable guide. In the method of the invention it is preferred to use adaptation means which are exchangeable adaptation elements comprising varying shapes of the respective guide walls facing the driving wheel.

The invention further relates to a set of driving wheels having varying diameters and the associated adaptation means intended for use in a method for adapting the driving characteristic of a driving element for closing means of an open roof construction for a vehicle, which adaptation means are exchangeable adaptation elements, which are intended for being placed along the circumference of the driving wheel for guiding pull-push cables into engagement with said driving wheel, wherein said adaptation elements each comprise at least one guide wall facing said driving wheel, whose shape is adapted to conform with the diameter of the associated driving wheel.

Finally, the invention relates to an open roof construction for a vehicle as mentioned above, wherein said driving wheel is selected from a set of several driving wheels having varying diameters, and adaptation means are provided for locally adapting the course of the cable guide to the diameter of the selected driving wheel.

The invention will be explained in more detail hereafter with reference to the drawings, which show an embodiment of the electric open roof construction according to the invention.

DESCRIPTION OF THE PREFERRED EMBODIMENT

Figure 1:
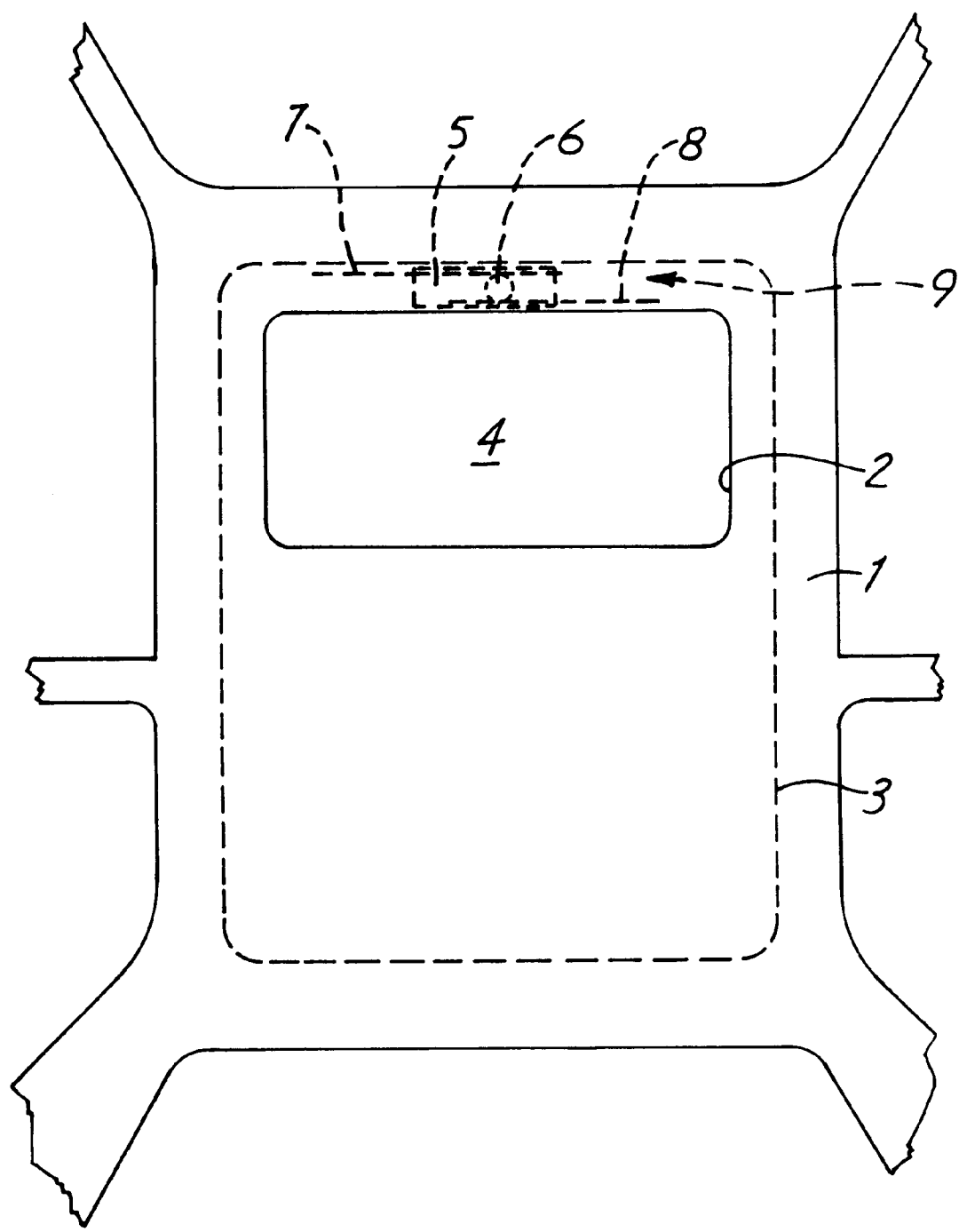
FIG. 1 is a highly diagrammatic plan view of a vehicle roof comprising the open roof construction according to the invention.

FIG. 1, shows a fixed roof 1 of a vehicle, such as a passenger car, in which roof 1 a roof opening 2 is recessed for mounting an open roof construction therein.

Said open roof construction comprises a frame 3, which can be attached to the fixed roof 1 of the vehicle, and which movably supports closing means 4 in a manner which is not shown. In the illustrated case, said closing means 4 are in the form of a rigid panel, which may or may not be transparent, but also all kinds of other closing means, such as slats, flexible upholstery or the like are possible. The closing means 4 close roof opening 2 in their closed position, and from said closed position they can be moved to an entirely or partially open position, wherein the roof opening 2 is released entirely or partially.

A driving element 5, which consists of an electric motor in this embodiment, is provided for moving said closing means 4. It would also be possible to use a hand-operated crank or the like, however. A driving wheel, a gear 6 in the present case, is connected to said driving element, and flexible pull-push cables 7, 8 are in engagement with said gear. Said driving cables are intended for adapting the closing means 4 by moving elements of operating mechanisms through longitudinal guides present on either side of frame 3, which longitudinal guides are not shown and which do not form part of the present invention.

In the illustrated case, the cables 7, 8 run directly through cable channels 10 in the front part of frame 3, cross beam 9, and not through tubes extending around frame 3.

Figure 2:
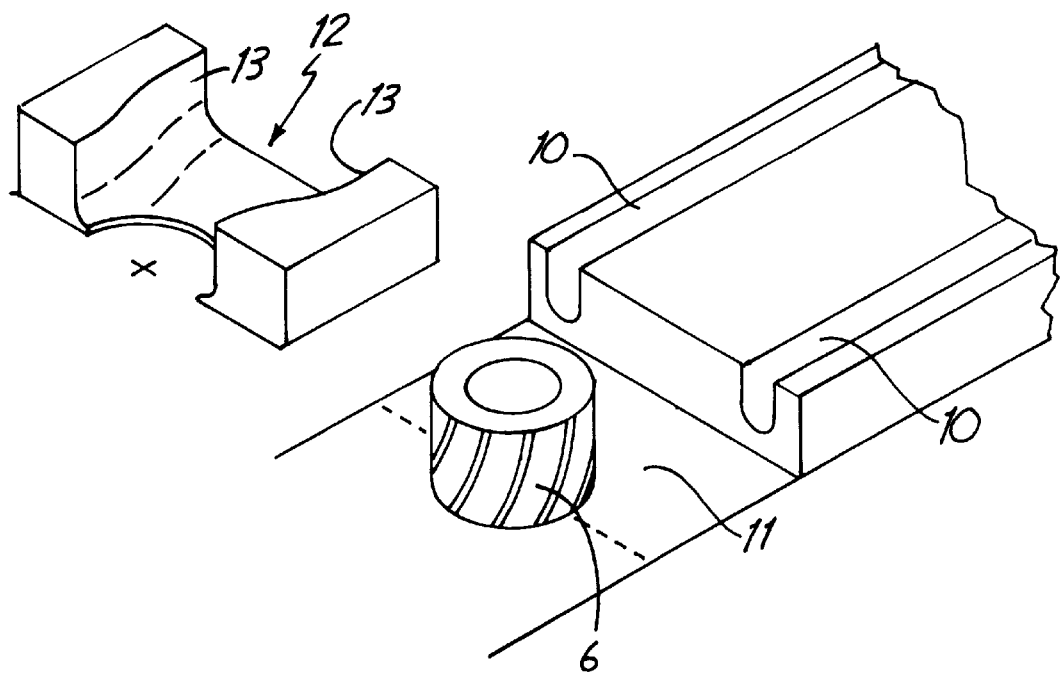
FIG. 2 is a larger-scale, perspective view of detail II in FIG. 1, wherein an adaptation element is shown separately.
Figure 3A:
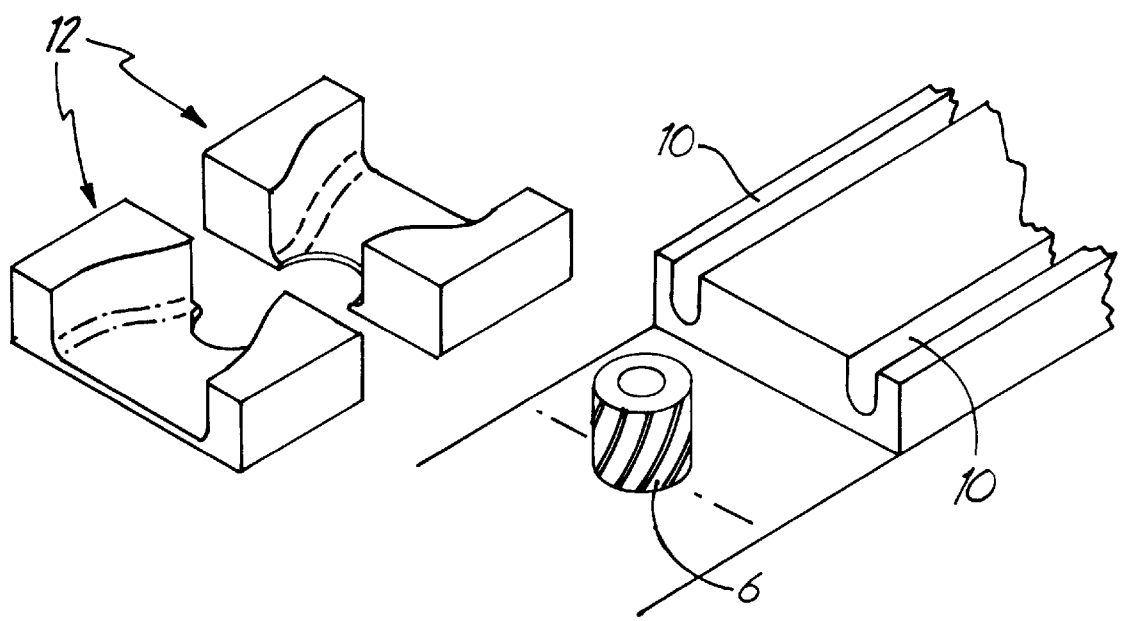
FIGS. 3A through 3B are diagrammatic views illustrating a plurality of adaptation elements.
Figure 3B:
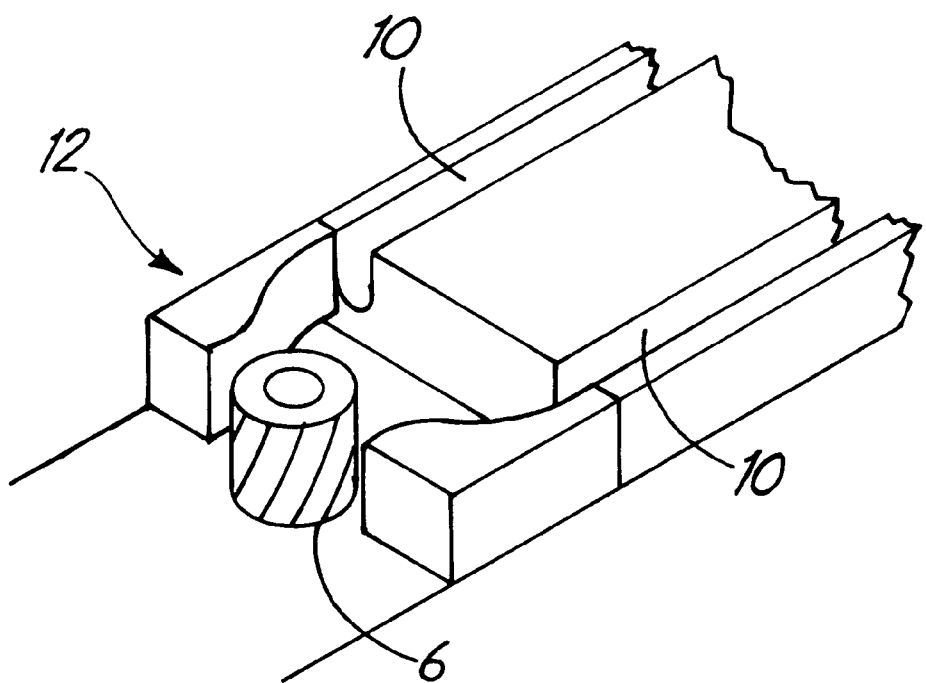

FIG. 2 shows the area around gear 6, wherein cable channels 10 can be distinguished. Furthermore it can be distinguished that cable channels 10 terminate at a point some distance away from gear 6. A cavity 11 is provided proximate gear 6. Said cavity 11 is intended for receiving two mirror-symmetrical adaptation elements 12, which are to be placed around gear 6. Said adaptation elements function to guide cables 7, 8 between cable channels 10 and the circumference of gear 6. Adaptation element 12 is provided with curved walls 13 to this end. At one end the curved wall 13 joins the outside walls of the cable channel 10 in question, and at the other end the curved wall 13 is spaced from gear 6 by a distance such that the cable 7, 8 in question can continue between gear 6 and curved wall 13, whereby the ribs formed on cable 7, 8 are kept in engagement with the teeth of gear 6. When a gear 6 having a different diameter is used, another adaptation element 12 comprising a differently configured wall 13 may be selected so as to guide cable 7, 8 into a different course. In this manner it is very simple to adapt the cable guide to gears 6 having a different diameter. In this respect it is preferred for at least one of the exchangeable adaptation elements to be positioned adjacent to the driving wheel (6) on the one hand and contiguously to the stationary cable guide (10) on the other hand.

The invention is not limited to the above-described embodiment and as shown in the drawing, which can be varied in several ways within the scope of the invention. Thus, it is also possible to use the invention for other types of cable guides, as long as they do not consist of deformable tubes. Instead of using adaptation elements, it is also possible to use insert pieces or movable parts for guiding the cable. Furthermore it is possible to use the invention in cases where the driving wheel is placed at another location, whereby the driving wheel may be a gear, but also a worm wheel, for example.

I claim:

1. An open roof construction for a vehicle having a roof opening in its fixed roof, which open roof construction comprises:

closing means for selectively closing or at least partially opening said roof opening;

a driving element for said closing means, which comprises an outgoing driving wheel;

at least one pull-push cable for providing a connection between said driving element and said closing means, which cable is guided in a cable guide and over a circumference of said driving wheel for adjustment of the cable by means of said driving element, wherein said cable guide is provided with adaptation means for deflecting a course of the cable guide to a diameter of said driving wheel; and wherein the adaptation means includes exchangeable adaptation elements comprising varying shapes of respective guide walls facing the driving wheel for deflecting the course of the cable.

2. The open roof construction according to claim 1, wherein said adaptation means are provided with an exchangeable adaptation element to be placed adjacent to the driving wheel and contiguously with the stationary cable guide.

3. The open roof construction according to claim 2, wherein two symmetrical adaptation elements are provided on either side of said driving wheel.

4. The open roof construction according to claim 1, wherein said cable guide is provided in the area that surrounds said driving wheel with fixed cable channels formed in a frame portion.

5. A method for adapting the driving characteristic of a driving element for movable closing means of an open roof construction for a vehicle, the method comprising:

providing a driving element fitted with an outgoing driving wheel; and providing a connection between the driving wheel and the closing means with a pull-push cable, which cable is guided over a circumference of the driving wheel for adjustment of the cable by means of the driving wheel, wherein said adjustment is carried out by selecting a driving wheel having a desired diameter from a set of several driving wheels having varying diameters, and using adaptation means for locally deflecting a course of the cable to the diameter of the driving wheel; and wherein the adaptation means are exchangeable adaptation elements comprising varying shapes of respective guide walls facing the driving wheel for deflecting the course of the cable.

6. A set of driving wheels having varying diameters and associated adaptation means intended for use in a method for adapting the driving characteristic of a driving element for movable closing means of an open roof construction for a vehicle, the adaptation means comprising:

exchangeable adaptation elements, which are intended for being placed along a circumference of a selected driving wheel for guiding pull-push cables into engagement with said driving wheel, wherein said adaptation elements each comprise at least one guide wall facing said driving wheel, which guide wall is adapted to deflect a cable path to the diameter of the associated selected driving wheel.

* * * * *